US005693366A

United States Patent [19]
Mase et al.

[11] Patent Number: 5,693,366
[45] Date of Patent: Dec. 2, 1997

[54] PROCESS FOR PRODUCING PLASTIC LENS COMPRISING A PRIMER LAYER, A HARD COAT LAYER AND AN ANTIREFLECTION COATING

[75] Inventors: Shoji Mase; Noboru Otani; Motoaki Yoshida, all of Osaka, Japan

[73] Assignee: Nippon Sheet Glass Co., Ltd., Osaka, Japan

[21] Appl. No.: 515,935

[22] Filed: Aug. 16, 1995

Related U.S. Application Data

[63] Continuation of Ser. No. 887,653, May 26, 1992, abandoned, which is a continuation-in-part of Ser. No. 540,064, Jun. 19, 1990, abandoned.

[30] Foreign Application Priority Data

Jun. 20, 1989 [JP] Japan ................................ 1-155826
Dec. 20, 1989 [JP] Japan ................................ 1-328260

[51] Int. Cl.$^6$ ....................................................... B05D 5/06
[52] U.S. Cl. ...................... 427/164; 427/168; 427/169; 427/385.5; 427/299; 427/387; 427/397.7; 427/407.1; 427/412.1; 427/412.5; 427/419.2
[58] Field of Search ............................. 427/164, 385.5, 427/387, 397.7, 168, 169, 407.1, 412.1, 412.5, 419.2

[56] References Cited

U.S. PATENT DOCUMENTS

| | | | |
|---|---|---|---|
| 4,824,927 | 4/1989 | Dobbelstein et al. | 528/88 |
| 4,847,346 | 7/1989 | Vorwerk et al. | 528/88 |
| 4,977,207 | 12/1990 | Hoefer et al. | 524/507 |
| 5,015,523 | 5/1991 | Kawashima et al. | 427/162 |

FOREIGN PATENT DOCUMENTS

| | | | |
|---|---|---|---|
| 0203730 | 12/1986 | European Pat. Off. | |
| 53-2567 | 1/1978 | Japan | 427/164 |
| 58-42001 | 3/1983 | Japan | 427/164 |
| 60-88901 | 5/1985 | Japan | 350/165 |
| 60-163001 | 8/1985 | Japan | 427/164 |
| 60-257401 | 12/1985 | Japan | 350/165 |
| 61-16042 | 4/1986 | Japan | 427/164 |
| 61-114203 | 5/1986 | Japan . | |
| 63-141001 | 6/1988 | Japan | 427/164 |

OTHER PUBLICATIONS

English Abstract of JP-A-61-114203 Toray.
Patent Abstracts of Japan, vol. 12, No. 401, abstract of JP-A-63 141 001, Jun. 1988.
Patent Abstracts of Japan, vol. 12, No. 315 abstract of JP-A-63 87 223, Apr. 1988.
Patent Abstracts of Japan, vol. 10, No. 7, abstract of JPA-A-60 163 001, Aug. 1985.

*Primary Examiner*—Janyce Bell
*Attorney, Agent, or Firm*—Sughrue, Mion, Zinn, Macpeak & Seas, PLLC

[57] ABSTRACT

A process for producing a plastic lens is disclosed, which comprises the steps of: providing a primer layer comprising a polyurethane on the surface of a plastic lens substrate; subsequently providing a hard coat layer comprising a silicone resin on the surface of the primer layer; and then providing a single-layer or multi-layer anti-reflection coating on the surface of the hard coat layer by depositing an inorganic material, wherein the polyurethane used for providing the primer layer is a thermosetting polyurethane.

1 Claim, No Drawings

PROCESS FOR PRODUCING PLASTIC LENS COMPRISING A PRIMER LAYER, A HARD COAT LAYER AND AN ANTIREFLECTION COATING

This is a Continuation of application Ser. No. 07/887,653 filed on May 26, 1992 (abandoned), which is a File Wrapper Continuation-in-Part of prior application Ser. No. 07/540,064 filed Jun. 19, 1990 (abandoned).

FIELD OF THE INVENTION

The present invention relates to a process for producing a plastic lens which is excellent in wear resistance, impact resistance, anti-reflection properties, weather resistance, chemical resistance and the adhesion of coated films.

BACKGROUND OF THE INVENTION

Plastics which are light in comparison with glass have drawn attention as materials for eye-glasses in recent years, and many plastic lenses having a high refractive index and exhibiting low chromatic aberration have been developed. Generally, the plastic lenses have a disadvantage in that they are liable to be damaged. Hence, a silicone hard coat film is generally provided on the surface of the lens, and further an anti-reflection coating is provided by depositing an inorganic material on the hard coat film to prevent surface reflection which causes flickering of an image.

However, plastic lenses provided with both the hard coat film and the anti-reflection coating have a disadvantage in that they are remarkably inferior in impact resistance to plastic lenses provided with neither film nor coating or provided with only the hard coat film. Many attempts have been made to solve the problem. For example, JP-A-63-87223 (the term "JP-A" as used herein means an "unexamined published Japanese patent application") and JP-A-63-141001 disclose a method wherein a primer layer composed of a polyurethane resin is provided between the plastic lens and the hard coat film.

In the method described in JP-A-63-87223 and JP-A-63-14001, a plastic lens is coated with a polyurethane resin solution and the solvent is then evaporated to form a polyurethane resin layer. The resulting polyurethane has no crosslinked structure, that is, the polyurethane is a thermoplastic resin. Accordingly, when the lens having the polyurethane layer is immersed in a hard coat solution to provide a hard coat layer on the lens, there is a possibility that the polyurethane is dissolved out from the polyurethane layer into the hard coat solution. Namely, because the polyurethane is soluble in the solvent, there is a possibility that the polyurethane is dissolved out from the layer into the hard coat solution which is then stained by the polyurethane.

Although the lens provided with the thermoplastic plastic polyurethane layer meets the requirements of FDA Standard 801.410 with respect to impact resistance, the layer no longer always withstands greater impacts.

SUMMARY OF THE INVENTION

The present inventors have made studies to solve the above-described problems associated with the prior art and found that when a primer layer comprising a thermosetting polyurethane is provided on the surface of a plastic lens substrate and a single-layer or multi-layer anti-reflection coating is formed thereon by depositing an inorganic material, the resulting plastic lens is superior in impact resistance to the lens having the thermoplastic polyurethane layer, and there is no fear that the hard coat solution is stained by the polyurethane dissolved, even when the lens having the polyurethane layer is immersed in the hard coat solution during the production thereof.

An object of the present invention is to provide a process for producing a plastic lens which is free from the problems associated with the prior art as mentioned above.

Another object of the present invention is to provide a process for producing a plastic lens which is excellent in wear resistance, impact resistance, anti-reflection properties, weather resistance, chemical resistance and the adhesion of coated films.

Other objects and effects of the present invention will become apparent from the following description.

Accordingly, the present invention provides a process for producing a plastic lens which comprises the steps of: providing a primer layer comprising a polyurethane on the surface of a plastic lens substrate; subsequently providing a hard coat layer comprising a silicone resin on the surface of the primer layer; and then providing a single-layer or multi-layer anti-reflection coating on the surface of the hard coat layer by depositing an inorganic material, wherein the polyurethane used for providing the primer layer is a thermosetting polyurethane.

DETAILED DESCRIPTION OF THE INVENTION

The present invention will be illustrated in more detail below.

Although there is no particular limitation with regard to the types of plastic lens substrates, CR-39 (a trade name of diethylene glycol bisallycarbonate made by PPG Industry) lenses, plastic lenses composed of polycarbonate, and plastic lenses composed of a polymer obtained by radical-polymerizing a monomer mixture containing an N-substituted phenylmaleimide derivative are preferred. Among these, a polymer obtained by radical-polymerizing a monomer mixture containing an N-substituted phenylmaleimide derivative is particularly preferred.

The polymerization method of radical-polymerising a monomer mixture containing an N-substituted phenylmaleimide derivative is well known in the art for conventional plastic lenses (such as those described in the Examples hereinafter) and comprises casting a monomer mixture into a mold assembled from a glass mold and a gasket made from an ethylene-vinyl acetate copolymer, heating it at a predetermined temperature for a predetermined period of time, taking out the product from the glass mold and post-curing it at a predetermined temperature for a predetermined period of time to thereby obtain a lens.

In one embodiment of the present invention, a lens is coated with a primer coating composition comprising a blocked polyisocyanate and a polyol and the coated primer is then cured by heating to form a primer layer.

Polyisocyanates are classified into a blocked type and a non-blocked type. Polyisocyanates that can be used in the present invention are limited to the blocked type. The term "blocked polyisocyanate" as used herein refers to a polyisocyanate wherein isocyanate groups are protected by a blocking agent. The reason why the polyisocyanates which are used in the present invention are limited to the blocked type is that if non-blocked polyisocyanates are used, the reaction of the active hydrogen atoms of polyol with isocyanate groups proceeds even at room temperature and the pot life of the coating material is greatly shortened. On the other hand, the blocked polyisocyanates on heating release the blocking agent and then the reaction of the reformed isocyanate groups with active hydrogen atoms takes place. Accordingly, the blocked polyisocyanates have a very long pot life at room temperature.

Examples of the blocked polyisocyanates include addition products obtained by bonding two or more molecules of hexamethylene diisocyanate, isophorone diisocyanate, 4,4'-dicyclohexylmethane diisocyanate or hydrogenated xylylene diisocyanate, and isocyanurates, allophanates, biurets and carbodiimides which are blocked with acetoacetic acid, malonic acid, oximes such as methyl ethyl ketoxime or the like. Preferred examples of the blocked polyisocyanates include blocked hexamethylene diisocyanate. Particularly preferred examples thereof include hexamethylene diisocyanate blocked with an oxime such as methyl ethyl ketoxime.

Examples of the polyols include compounds having a plurality of hydroxyl groups per molecule and a backbone structure of a polyester, polyether, polycaprolactone, polycarbonate or polyacrylate. Preferred examples of the polyols include polyester polyols and polyacrylate polyols. Particularly preferred examples thereof include polyacrylate polyols.

The proportion of the blocked polyisocyanate and the polyol is generally such that the molar ratio of isocyanate groups to hydroxyl groups is from 0.8 to 1.25, and particularly preferably from 0.85 to 1.2. When the ratio is lower than 0.8 or higher than 1.2, the crosslink density of cured film tends to be low and impact resistance may not be improved.

A curing catalyst must be used in the reaction of the blocked polyisocyanate with the polyol. Preferred examples of the curing catalyst include tertiary amine compounds, organotin compounds and organozinc compounds. Examples of the tertiary amine compounds include triethylamine, N,N',N',N'-tetramethylpropylenediamine and N,N,N'N'-tetramethylhexamethylenediamine. Examples of the organotin compounds include tin caprylate, dibutyltin diacetate and dibutyltin dilaurate. Examples of the organozinc compounds include zinc caprylate and zinc naphthenate. The curing catalysts particularly preferably used in the present invention include organotin compounds. Among these, dibutyltin diacetate and dibutyltin dilaurate are most preferred.

The concentration of the curing catalyst is generally in the range of from 0.1 to 5 wt %, preferably from 0.2 to 1.5 wt %, based on the total amount of the blocked polyisocyanate and the polyol. When the concentration is lower than 0.1 wt %, a long curing time tends to be required and hence workability is poor.

The primer coating composition used in the present invention is diluted with a solvent. Examples of the solvent for use as a diluent include alcohols, ketones, esters and ethers. Other conventional solvents can also be used. Diacetone alcohol, ethyl acetate and methyl ethyl ketone are particularly preferred. These solvents may be used either alone or as a mixture of two or more of them. If desired, a leveling agent for improving coatability, an ultraviolet light absorber for improving weather resistance and an antioxidant may be added to the primer coating composition.

The primer coating composition can be coated by any conventional coating methods such as a spin coating method, dip coating method, etc., without particular limitation. It is preferred that the lens is subjected to a pretreatment such as an alkali treatment, plasma treatment or ultraviolet light treatment.

The primer layer can be formed by coating a lens with the primer coating material followed by drying if necessary, and heating it at a temperature of from 100° to 140° C., and preferably from 110° to 130° C. When the temperature is lower than 100° C., the blocking agent is not released from the blocked polyisocyanate and a curing reaction does not proceed, while when the temperature is higher than 140° C., the lens is deformed. The curing time varies depending on the heating temperature, but is generally from 15 to 90 minutes.

The thickness of the primer layer is from 0.05 to 5 µm, and preferably from 0.1 to 2 µm. When the thickness is less than 0.05 µm, the impact resistance is very poor, while when the thickness is more than 5 µm, surface accuracy is lowered.

The primer layer preferably has a tensile strength of 50 kg/cm$^2$ or more, preferably 70 kg/cm$^2$ or more, and an elongation at breakage of 60% or more, preferably 70% or more. If the tensile strength is less than 50 kg/cm$^2$ or the elongation at breakage is less than 60%, the impact resistance cannot be greatly improved.

In the present invention, a hard coat layer composed of a silicone resin is provided on the above-described polyurethane primer layer. Any of the silicone resins can be used for the formation of the hard coat layer. As the silicone resin, a composition comprising a co-hydrolytic product of (1a) a colloidal silica preferably having an average particle diameter of from 50 to 200 Å and (2) a silane compound containing functional groups such as an epoxy group and a methacryl group, or a co-hydrolytic product of (1b) a silane compound containing no functional group and the above silane compound (2) is preferred. The amount of the component (1a) or (1b) is preferably from 5 to 50 wt % based on the total amount of the components (1a) or (1b), and (2). Examples of the silane compound (2) include γ-glycidoxypropyltrimethoxysilane, γ-glycidoxypropylmethyldiethoxysilane and γ-methacroyloxypropyltrimethoxysilane.

The reason why the silicone resins are used is that the silicone resins give a hard coat layer having a higher hardness than that of hard coat layers formed from melamine resins or acrylic resins. If such higher hardness is not required, melamine resins or acrylic resins may be used.

Hard coat agents (solutions) used in the present invention are generally composed of a silicone resin, a curing catalyst capable of promoting the reaction of functional groups contained in the silicone resin, and a solvent. In the present invention, any type of silicone hard coat agents can be used, but a hard coat agent of the type in which a co-hydrolytic product of a colloidal silica and a silane compound containing functional groups is cured by a curing catalyst is preferably used.

Hard coat agents (solutions) may be coated by any of a conventional methods such as a dip coating method, spray coating method, spin coating method, etc. However, a dip coating method is most preferred from the viewpoint of workability. After the hard coat agent is coated, the agent is cured by means of heating, ultraviolet light irradiation, electron beam irradiation, etc., according to the types of hard coat agents to be cured to form a hard coat layer on the polyurethane primer layer provided on the surface of the plastic lens.

The thickness of the hard coat layer is preferably from 2 to 5 µm.

In the present invention, a single-layer or multi-layer anti-reflection coating is further provided on the hard coat layer composed of a silicone resin. Examples of materials suitable for use in forming the anti-reflection coating include metals and oxides and fluorides of metals or semimetals. More specifically, typical examples thereof include metal oxides such as $SiO_2$ and $ZrO_2$ and fluorides such as $MgF_2$. The single-layer or multi-layer anti-reflection coating can be formed by means of various deposition methods such as vacuum deposition, a sputtering process, an ion plating method, an ion beam assisted method or the like.

Examples of the constitution of the multi-layer anti-reflection coating include that in which a layer composed of $ZrO_2$ (thickness: $\lambda_0/12$), a layer composed of $SiO_2$ (thickness: $\lambda_0/12$), a layer composed of $ZrO_2$ (thickness: $\lambda_0/2$), and a layer composed of $SiO_2$ (thickness: $\lambda_0/4$) are provided in this order on the surface of the hard coat layer, in which $\lambda_0$ represents a wavelength of light of 520 nm.

According to the present invention, the primer layer comprising a thermosetting polyurethane is provided between the plastic lens and the hard coat layer. Accordingly, even when the lens is provided with the anti-reflection coating on the surface of the hard coat layer, the lens meets the requirements of FDA Standard 801.410 and is superior in impact resistance to the lens provided with a primer layer composed of a thermoplastic polyurethane. Further, even when the lens provided with the primer layer according to the present invention is immersed in a hard coat solution, there is no fear that polyurethane is dissolved out from the primer layer into the hard coat solution and the solution is stained thereby, because polyurethane which is a primer component is a thermosetting resin.

The present invention is now illustrated in greater detail by reference to the following examples which, however, are not to be construed as limiting the invention in any way.

The performance of a plastic lens having a plurality of films (layers) was evaluated by the following methods.

(1) Adhesion of film (layer)

Cross-cut tape testing was made in the following manner to evaluate the adhesion of a film. Namely, 100 cuts (a cut 1 mm square) were made on the surface of a lens having films thereon. A cellophane adhesive tape was adhered thereon and vigorously peeled off. The number of cross-cut portions of film left intact without being peeled off from the lens was counted. The results were expressed by m/100 in which m represents the number of the remaining cuts. In the results of cross-cut tape testing, 100/100 means that the film is not peeled off at all.

(2) Wear resistance

A plastic lens substrate having a primer layer and a hard coat layer was rubbed with #0000 steel wool. The damage was examined, and evaluation was made by the following criteria.

A: Not damaged even by vigorous rubbing

B: Slightly damaged by vigorous rubbing

C: Damaged by slight rubbing (3) Dyeability

A lens was immersed in a dye bath comprising 2 parts of "PLAX BROWN D" (conventional disperse dye, a product of Hattori Seiko Co., Ltd.) and 3 parts of "PLAX DYE AID" in 1,000 parts of water at 90° C. for 10 minutes to dye it. Visible light transmittance was measured with "TOPCON SUNGLASS TESTER" (manufactured by Tokyo Optical Equipments Co., Ltd.). When the measured value was not higher than 80%, dyeability was judged to be good.

(4) Adhesion of anti-reflection coating

A $SiO_2/ZrO_2$ type five-layer anti-reflection coating was formed on a plastic lens substrate having a primer layer and a hard coat layer by means of vacuum deposition. The surface of the anti-reflection coating was rubbed with #0000 steel wool. The change in reflected color was examined and evaluation was made by the following criteria.

A: Reflected color was not changed even when vigorously rubbed.

B: The coating was marred by vigorous rubbing and the marred portion was whitened, but reflected color of areas other than marred portion was not changed.

C: The coating was scraped off by slight rubbing and the rubbed area was completely whitened.

(5) Impact resistance

Evaluation was made by means of a steel ball drop-weight test. Steel balls in order of weight as given in Table 1 were allowed to drop by gravity from a height of 127 cm toward the center of the lens. The weight of the steel ball just prior to the first cracked steel ball was referred to as impact resistance. All of the lenses subjected to this test (except Examples 27 and 28) had a central thickness of 1.2 mm.

(6) Properties of primer layer

The primer coating composition was coated on a polypropylene plate to a dry thickness of about 50 μm followed by being cured at 120° C. for 30 minutes and further at 130° C. for 60 minutes. The cured film was peeled off from the plate and was cut out by using a die (JIS Dumbbell No. 2) to form a test piece. The test piece was measured for tensile strength and elongation at breakage by using a mechanical property tester "(STROGRAPH R", made by Toyo Seiki Manufacturing, Ltd.) at a tensile rate of 100 mm/min.

The lenses subjected to the tests for wear resistance, adhesion of anti-reflection coating and impact resistance were provided with all of the primer layer, the hard coat layer and the anti-reflection coating. The tests on adhesion of the film and dyeability were tests on the performance of the lenses provided with the primer layer and the hard coat layer before the anti-reflection coating was formed.

EXAMPLE 1

(1) Preparation of plastic lens substrate

A mixed solution consisting of 20 parts by weight of 2-chlorophenylmaleimide, 20 parts by weight of 2,2-bis(3,5-dibromo-4-methacryloyloxyethoxyphenyl)propane, 30 parts by weight of tribromophenyl methacrylate, 25 parts by weight of diallyl isophthalate, 5 parts by weight of polyethylene glycol dimetharylate (n=4), 1 part by weight of 2-(2'-hydroxy-3',5'-di-tert-butylphenyl)-5-chlorobenzotriazole as an ultraviolet light absorber and 2 parts by weight of t-butyl peroxy-(2-ethylhexanoate) as a radical polymerization initiator was cast into a mold assembled from a glass mold and a gasket made from an ethylene-vinyl acetate copolymer and heated from 40° to 120° C. over a period of 20 hours. The formed lens was taken-out from the glass mold and post-cured at 120° C. for one hour. The resulting lens was found to be a good optical plastic lens having no internal strain. The thus-obtained lens was used as plastic lens substrate.

(2) Preparation coating and curing of primer composition

A mixture of 11.72 parts by weight of commercially available polyester polyol (DESMOPHEN 670, low branched polyester polyol, a product of Sumitomo Bayer Urethane Co., Ltd.), 11.02 parts by weight of commercially available blocked polyisocyanate (BL-3175, 75% solvent naphtha 100 solution of isocyanurate of hexamethylene diisocyanate blocked with oxime, a product of Sumitomo Bayer Urethane Co., Ltd.), 0.20 part by weight of dibutyltin dilaurate as a curing catalyst, 0.10 part by weight of commercially available fluorine-containing leveling agent (FLUORAD FC430, fluorinated alkyl ester, a product of Sumitomo 3M Co., Ltd.) as a leveling agent and 76.96 parts by weight of diacetone alcohol as a solvent was sufficiently stirred till a uniform composition was obtained, thus obtaining a primer composition.

The plastic lens substrate obtained in the above item (1) was subjected to an alkali treatment as a pretreatment in such a manner that the lens was immersed in a 8% sodium hydroxide aqueous solution for 15 minutes at room temperature followed by water washing, ultrasonic cleaning and drying with flon vapor, and then coated with the primer composition by a dip coating method (pulling-up rate of 200 cm/min). The thus-coated lens was air-dried at room temperature for 15 minutes and heat-treated at 120° C. for 30 minutes to cure the primer, whereby a primer layer of 1.5 µm was formed on the lens.

(3) Coating and curing of silicone hard coat agent

The surface of the primer layer of the plastic lens substrate having the primer layer obtained in the above item (2) was coated with commercially available dyeable silicone hard coat agent (TS-56-T, a product of Tokuyama Soda Co., Ltd.) by a dip coating method (pulling-up rate of 60 cm/min). The thus-coated lens was air-dried at room temperature for 15 minutes and heat-treated at 130° C. for 60 minutes to cure the hard coat agent, whereby a hard coat layer having a thickness of 3 µm. was formed.

(4) Formation of anti-reflection coating

A $SiO_2/ZrO_2$ type four-layer anti-reflection coating was formed on the plastic lens substrate having the primer layer and the silicone-based hard coat layer obtained in the above item (3). The anti-reflection coating was composed of a layer of $ZrO_2$ (thickness: $\lambda_0/12$), a layer of $SiO_2$ (thickness: $\lambda_0/12$), a layer of $ZrO_2$ (thickness: $\lambda_0/2$), and a layer of $SiO_2$ (thickness: $\lambda_0/4$) in this order from the hard coat in which $\lambda_0$ represents a wavelength of light of 520 nm.

The adhesion of film (layer), the wear resistance, the dyeability, the adhesion of the anti-reflection coating, and the impact resistance of the lens were measured and the results obtained are shown in Table 2 below.

It is apparent from the test results of Table 2 that the thus-obtained plastic lens having a composite film is excellent in adhesion of films, wear resistance, dyeability, adhesion of anti-reflection coating, and impact resistance.

EXAMPLE 2

The procedure of Example 1 was repeated except that a mixture consisting of 4.27 parts by weight of commercially available polyester polyol (DESMOPHEN 670), 6.28 parts by weight of commercially available blocked polyisocyanate (BURNOCK-500, 65% ethyl acetate solution of addition product of few molecules of toluene diisocyanate blocked with oxime, a product of Dainippon Ink & Chemical Inc.), 0.10 part by weight of dibutyltin dilaurate as a curing catalyst, 0.10 part by weight of commercially available fluorine-containing leveling agent (FLUORAD FC-430) as a leveling agent and 89.25 parts by weight of ethyl acetate as a solvent was thoroughly stirred to obtain a uniform composition which was then used as a primer composition. There was obtained a plastic lens having a composition film. In the same way as in Example 1, tests were carried out. The test results are shown in Table 2.

EXAMPLE 3

The procedure of Example 1 was repeated except that a mixture consisting of 5.22 parts by weight of commercially available polyester type polyol (DESMOPHEN 670), 4.78 parts by weight of commercially available blocked polyisocyanate (CORONATE 2507, 80% methyl ethyl ketone solution of addition product of few molecules of blocked hexamethylene diisocyanate a product of Nippon Polyurethane Co., Ltd), 0.10 part by weight of dibutyltin dilaurate as a curing catalyst, 0.10 part by weight of commercially available fluorine-containing leveling agent (FLUORAD FC-430) as a leveling agent and 89.90 parts by weight of methyl ethyl ketone as a solvent was thoroughly stirred to prepare a uniform composition which was then used as a primer composition. There was obtained a plastic lens having a composite film. In the same way as in Example 1, tests were conducted. The results are shown in Table 2.

EXAMPLE 4

The procedure of Example 1 was repeated except that commercially available non-dyeable type silicone based hard coat agent (TS-56-H, a Tokuyama Soda Co., Ltd.) was used to prepare a plastic lens having a composite film. In the same way as in Example 1, tests were conducted. The test results are shown in Table 2.

EXAMPLE 5

The procedure of Example 2 was repeated except that commercially available non-dyeable type silicone based hard coat agent (TS-56-H, a product of Tokuyama Soda Co., Ltd.) was used to prepare a plastic lens having a composite film. In the same way as in Example 1, tests were conducted. The test results are shown in Table 2.

EXAMPLE 6

The procedure of Example 1 was repeated except that a mixture consisting of 13.63 parts by weight of commercially available polyacrylate type polyol (DESMOPHEN A565, 65% xylene solution of polyacrylate, a product of Sumitomo Bayer Urethane Co., Ltd.), 8.19 parts by weight of commercially available blocked polyisocyanate (BL-3175), 0.15 part by weight of dibutyltin dilaurate as a curing catalyst, 0.10 part by weight of commercially available fluorine-containing leveling agent (FLUORAD FC-430) and 77.03 parts by weight of methyl ethyl ketone as a solvent was thoroughly stirred to prepare a uniform composition as a primer composition, and a silicone-based hard coat agent (TS-56-H, a product of Tokuyama Soda Co., Ltd.) was used. There was obtained a plastic lens having a composite film. In the same way as in Example 1, tests were conducted. The test results are shown in Table 2.

EXAMPLE 7

(1) Preparation of plastic lens substrate

A mixed solution consisting of 10 parts by weight of N-(2,6-diethylphenylmaleimide), 40 parts by weight of diphenic acid, diallyl ester, 10 parts by weight of 2,2-bis(4-acryloyloxypolyethoxyphenyl)propane wherein the number of ethoxy groups was 4 (BA-611, a product of Sanyo Chemical Industries, Ltd.), 20 parts by weight of 2,2-bis(3,5-dibromo-4-methacryloyloxyethoxyphenyl)propane, 0.1 part by weight of 2,4-dihydroxybenzophennone as an ultraviolet light absorber and 2 parts by weight of t-butyl peroxy(2-ethylhexanoate) as a radical polymerization initiator was cast into a mold assembled from a glass mold and a gasket made from low-density polyethylene and heated from 50° to 100° C. over a period of 20 hours. The resulting lens was taken out from the glass mold and post-cured at 120° C. for one hour. The resulting lens was found to be a good optical plastic lens having no internal strain. The thus-obtained lens was used as the plastic lens substrate.

(2) Preparation, coating and curing of primer composition

The procedure of item (2) of Example 1 was repeated except that the lens obtained in the above item (1) was used.

(3) Coating and curing of silicone type hard coat agent

The procedure of item (3) of Example 1 was repeated except that the lens obtained in the above item (1) was used.

(4) Formation of anti-reflection coating

The procedure of item (4) Example 1 was repeated except that the lens obtained in the above item (1) was used.

The lens obtained was measured and evaluated in the same manner as in Example 1, and the results are shown in Table 2.

EXAMPLES 8 to 12

The procedure of each of Examples 2 to 6 was repeated except that the lens substrate obtained in Example 7 was used.

The lenses obtained each was measured and evaluated in the same manner as in Example 1, and the results are shown in Table 2.

EXAMPLE 13

(1) Preparation of plastic lens substrate

A mixed solution consisting of 15 parts by weight of N-(2-chlorophenylmaleimide), 30 parts by weight of 2,2-bis(3,5-dibromo-4-methacryloyloxyethoxyphenyl)propane, 15 parts by weight of tribromophenyl methacrylate, 20 parts by weight of diallyl isophthalate, 10 parts by weight of 2,2-bis(4-acryloyloxypolyethoxyphenyl)propane wherein the number of ethoxy groups being 4 (BA-611, a product of Sanyo Chemical Industries, Ltd.), 10 parts by weight of benzyl methacrylate, 1.0 part by weight of 2,4-dihydroxybenzophenone as an ultraviolet light absorber and 2 parts by weight of t-butyl peroxy(2-ethylhexanoate) as a radical polymerization initiator was cast into a mold assembled from a glass mold and a gasket made from low-density polyethylene and heated from 50° to 100° C. over a period of 20 hours. The formed lens was taken out from the glass mold and post-cured at 120° C. for one hour. The resulting lens was found to be a good optical plastic lens having no internal strain. The thus-obtained lens was used as the plastic lens substrate.

(2) Preparation coating and curing of primer composition

The procedure of item (2) of Example 1 was repeated except that the lens obtained in the above item (1) was used.

(3) Coating and curing of silicone type hard coat agent

The procedure of item (3) of Example 1 was repeated except that the lens obtained in the above item (1) was used.

(4) Formation of anti-reflection coating

The procedure of item (4) of Example 1 was repeated except that the lens obtained in the above item (1) was used.

The lens obtained was measured and evaluated in the same manner as in Example 1, and the results are shown in Table 2.

EXAMPLES 14 and 15

The procedure of each of Examples 5 and 6 was repeated except that the lens substrate obtained in Example 13 was used.

The lenses obtained each was measured and evaluated in the same manner as in Example 1, and the results are shown in Table 2.

EXAMPLE 16

(1) Preparation of plastic lens substrate

A mixed solution consisting of 15 parts by weight of N-(2-diethylphenylmaleimide), 20 parts by weight of 2,2-bis(3,5-dibromo-4-methacryloyloxyethoxyphenyl)propane, 35 parts by weight of tribromophenyl methacrylate, 25 parts by weight of diallyl isophthalate, 5 parts by weight of polyethylene glycol dimethacrylate (n=4), 0.1 part by weight of 2-(hydroxy-5-t-octylphenyl)benztriazole as an ultraviolet light absorber and 2 parts by weight of t-butyl peroxypivalate as a radical polymerization initiator was cast into a mold assembled from a glass mold and a gasket made from low-density polyethylene and heated from 40° to 100° C. over a period of 20 hours. The lens formed was taken out from the glass mold and post-cured at 120° C. for one hour. The resulting lens was found to be a good optical plastic lens having no internal strain. The thus-obtained lens was used as the plastic lens substrate.

(2) Preparation, coating and curing of primer composition

The procedure of item (2) of Example 1 was repeated except that the lens obtained in the above item (1) was used.

(3) Coating and curing of silicone type hard coat agent

The procedure of item (3) of Example 1 was repeated except that the lens obtained in the above item (1) was used.

(4) Formation of anti-reflection coating

The procedure of item (4) of Example 1 was repeated except that the lens obtained in the above item (2) was used.

The lens obtained was measured and evaluated in the same manner as in Example 1, and the results are shown in Table 2.

EXAMPLES 17 and 18

The procedure of each of Examples 5 and 6 was repeated except that the lens substrate obtained in Example 16 was used.

The lenses obtained each was measured and evaluated in the same manner as in Example 1, and the results are shown in Table 2.

EXAMPLE 19

(1) Preparation of plastic lens substrate

A mixed solution consisting of 20 parts by weight of N-(2-chlorophenylmaleimide), 25 parts by weight of diallyl ester of diphenic acid, 5 parts by weight of 2,2-bis(4-acryloyloxypolyethoxyphenyl)propane wherein the number of ethoxy groups being 4) (BA-611, a product of Sanyo Chemical Industries, Ltd.), 25 parts by weight of 2,2-bis(3,5-dibromo-4-methacryloyloxyethoxyphenyl)propane, 25 parts by weight of diallyl isophthalate, 0.1 part by weight of 2,4-dihydroxybenzophenone as an ultraviolet light absorber and 2 parts by weight of t-butyl peroxy(2-ethylhexanoate) as a radical polymerization initiator was cast into a mold assembled from a glass mold and a gasket made from low-density polyethylene and heated from 50° to 100° C. over a period of 20 hours. The lens formed was taken out from the glass mold and post-cured at 120° C. for one hour. The resulting lens was found to be a good optical plastic lens having no internal strain. The thus-obtained lens was used as the plastic lens substrate.

(2) Preparation coating and curing of primer composition

The procedure of item (2) of Example 1 was repeated except that the lens obtained in the above item (1) was used.

(3) Coating and curing of silicone type hard coat agent

The procedure of item (3) of Example 1 was repeated except that the lens obtained in the above item (1) was used.

(4) Formation of anti-reflection coating

The procedure of item (4) of Example 1 was repeated except that the lens obtained in the above item (1) was used.

The lens obtained was measured and evaluated in the same manner as in Example 1, and the results are shown in Table 2.

EXAMPLES 20 and 21

The procedure of each of Examples 5 and 6 was repeated except that the lens substrate obtained in Example 19 was used.

The lenses obtained each was measured and evaluated in the same manner as in Example 1, and the results are shown in Table 2.

EXAMPLE 22

(1) Preparation of plastic lens substrate

A mixed solution consisting of 10 parts by weight of N-(2,6-diethylphenylmaleimide), 20 parts by weight of diallyl ester of diphenic acid, 5 parts by weight of 2,2-bis(4-acryloyloxypolyethoxyphenyl)propane wherein the number of ethoxy groups being 4 (BA-611, a product of Sanyo Chemical Industries, Ltd.), 25 parts by weight of 2,2-bis(3,5-dibromo-4-methacryloyloxyethoxyphenyl)propane, 25 parts by weight of diallyl isophthalate, 15 parts by weight of tribromophenyl methacrylate, 0.2 part by weight of 2-(hydroxy-5-t-octylphenyl)benztriazole as an ultraviolet light absorber and 2 parts by weight of t-butyl peroxy(2-ethylhexanoate) was cast into a mold assembled from a glass mold and a gasket made from low-density polyethylene and heated from 50° to 100° C. over a period of 20 hours. The lens formed was taken out from the glass mold and post-cured at 120° C. for one hour. The resulting lens was found to be a good optical plastic lens having no internal strain. The thus-obtained lens was used as the plastic lens substrate.

(2) Preparation, coating and curing of primer composition

The procedure of item (2) of Example 1 was repeated except that the lens obtained in the above item (1) was used.

(3) Coating and curing of silicone type hard coat agent

The procedure of item (3) of Example 1 was repeated except that the lens obtained in the above item (1) was used.

(4) Formation of anti-reflection coating

The procedure of item (4) of Example 1 was repeated except that the lens obtained in the above item (1) was used.

The lens obtained was measured and evaluated in the same manner as in Example 1, and the results are shown in Table 2.

EXAMPLES 23 and 24

The procedure of each of Examples 5 and 6 was repeated except that the lens substrate obtained in Example 22 was used.

The lenses obtained each was measured and evaluated in the same manner as in Example 1, and the results are shown in Table 2.

EXAMPLES 25 and 26

The procedure of each of Examples 5 and 6 was repeated except that a CR-39 lens was used as the lens substrate.

The lenses obtained each was measured and evaluated in the same manner as in Example 1, and the results are shown in Table 2.

EXAMPLES 27 and 28

The procedure of each of Examples 5 and 6 was repeated except that a CR-39 lens having a central thickness of 2.0 mm was used as the lens substrate.

The lenses obtained each was measured and evaluated in the same manner as in Example 1, and the results are shown in Table 2.

COMPARATIVE EXAMPLE 1

The procedure of Example 1 was repeated except that a mixture consisting of 32.26 parts by weight of commercially available thermoplastic polyurethane (LQ 3510, 30% solution of polyurethane dissolved in toluene and isopropyl alcohol, a product of Sanyo Chemical Industries, Ltd.), 0.06 part by weight of commercially available fluorine-containing leveling agent (FLUORAD FC-430) as a leveling agent, 45.12 parts by weight of toluene as a solvent and 22.56 parts by weight of isopropyl alcohol as a solvent was thoroughly stirred to obtain a uniform composition as a primer composition, and the pulling-up rate during the coating with the primer composition was 10 cm/min. There was obtained a plastic lens having a composite film. In the same way as in Example 1, the tests were conducted. The test results are shown in Table 2.

COMPARATIVE EXAMPLE 2

The procedure of Example 1 was repeated except that a mixture consisting of 16.67 parts by weight of commercially available thermoplastic polyurethane (LQ 3505, a product of Sanyo Chemical Industries, Ltd.), 0.06 part by weight of commercially available fluorine-containing leveling agent (FLUORAD FC-430) as a leveling agent, 55.52 parts by weight of toluene as a solvent and 27.76 parts by weight of isopropyl alcohol was thoroughly stirred to obtain a uniform composition as a primer composition, and the pulling-up rate during the coating with the primer composition was 10 cm/min. There was obtained a plastic lens having a composite film. In the same way as in Example 1, the tests were conducted. The test results are shown in Table 2.

COMPARATIVE EXAMPLE 3

The procedure of Example 6 was repeated except that the primer layer was omitted. There was obtained a plastic lens having a composite film. In the same way as in Example 1, the tests were conducted. The test results are shown in Table 2.

COMPARATIVE EXAMPLE 4

The procedure of Comparative Example 3 was repeated except that a CR-39 lens was used as the lens substrate.

The lenses obtained each was measured and evaluated in the same manner as in Example 1, and the results are shown in Table 2.

COMPARATIVE EXAMPLE 5

The procedure of Comparative Example 3 was repeated except that a CR-39 lens having a central thickness of 2.0 mm was used as the lens substrate.

The lenses obtained each was measured and evaluated in the same manner as in Example 1, and the results are shown in Table 2.

TABLE 1

| No. | Diameter (mm) | Weight (g) |
|---|---|---|
| 1 | 6.35 | 1.04 |
| 2 | 7.94 | 2.04 |
| 3 | 8.73 | 2.72 |
| 4 | 9.53 | 3.53 |

TABLE 1-continued

| No. | Diameter (mm) | Weight (g) |
| --- | --- | --- |
| 5 | 10.00 | 4.08 |
| 6 | 10.32 | 4.48 |
| 7 | 11.11 | 5.59 |
| 8 | 11.96 | 6.88 |
| 9 | 12.30 | 7.60 |
| 10 | 12.70 | 8.36 |
| 11 | 13.49 | 10.02 |
| 12 | 14.29 | 11.90 |
| 13 | 15.08 | 13.99 |
| 14 | 15.88 | 16.32 |
| 15 | 16.66 | 18.89 |
| 16 | 17.46 | 21.72 |
| 17 | 18.26 | 24.52 |
| 18 | 19.05 | 28.20 |
| 19 | 19.84 | 31.87 |
| 20 | 20.64 | 35.85 |
| 21 | 21.43 | 40.15 |
| 22 | 22.23 | 44.78 |
| 23 | 23.02 | 49.75 |
| 24 | 23.81 | 55.07 |
| 25 | 24.00 | 56.38 |
| 26 | 25.00 | 63.73 |
| 27 | 25.40 | 66.84 |
| 28 | 26.99 | 80.17 |
| 29 | 28.58 | 95.17 |
| 30 | 30.16 | 111.90 |
| 31 | 31.75 | 130.50 |
| 32 | 33.34 | 151.10 |
| 33 | 34.93 | 173.80 |
| 34 | 36.51 | 198.50 |
| 35 | 38.10 | 225.60 |
| 36 | 41.28 | 286.80 |
| 37 | 44.45 | 358.20 |
| 38 | 47.63 | 440.60 |
| 39 | 50.80 | 534.70 |

TABLE 2

| | Adhesion of film | Wear resistance | Dye-ability | Adhesion of anti-reflection coating | Impact resistance (g) |
| --- | --- | --- | --- | --- | --- |
| Example 1 | 100/100 | B | good | B | 28.20 |
| Example 2 | 100/100 | B | good | B | 24.52 |
| Example 3 | 100/100 | B | good | B | 40.15 |
| Example 4 | 100/100 | B | good | A | 28.20 |
| Example 5 | 100/100 | B | good | A | 28.20 |
| Example 6 | 100/100 | A | good | A | 24.52 |
| Example 7 | 100/100 | B | good | B | 24.52 |
| Example 8 | 100/100 | B | good | B | 21.72 |
| Example 9 | 100/100 | B | good | B | 35.85 |
| Example 10 | 100/100 | B | good | A | 24.52 |
| Example 11 | 100/100 | B | good | A | 28.20 |
| Example 12 | 100/100 | A | good | A | 24.52 |
| Example 13 | 100/100 | B | good | B | 28.20 |
| Example 14 | 100/100 | B | good | A | 24.52 |
| Example 15 | 100/100 | A | good | A | 31.87 |
| Example 16 | 100/100 | B | good | B | 31.87 |
| Example 17 | 100/100 | B | good | A | 28.20 |
| Example 18 | 100/100 | A | good | A | 31.87 |
| Example 19 | 100/100 | B | good | B | 28.20 |
| Example 20 | 100/100 | B | good | A | 24.52 |
| Example 21 | 100/100 | A | good | A | 21.72 |
| Example 22 | 100/100 | B | good | B | 28.20 |
| Example 23 | 100/100 | B | good | A | 31.87 |
| Example 24 | 100/100 | A | good | A | 28.20 |
| Example 25 | 100/100 | B | good | A | 63.73 |
| Example 26 | 100/100 | A | good | A | 66.84 |
| Example 27 | 100/100 | B | good | A | 173.80 |
| Example 28 | 100/100 | A | good | A | 198.50 |
| Comparative Example 1 | 100/100 | B | good | B | 18.89 |

TABLE 2-continued

| | Adhesion of film | Wear resistance | Dye-ability | Adhesion of anti-reflection coating | Impact resistance (g) |
| --- | --- | --- | --- | --- | --- |
| Comparative Example 2 | 100/100 | B | good | B | 16.32 |
| Comparative Example 3 | 100/100 | A | poor | A | 6.88 |
| Comparative Example 4 | 100/100 | A | poor | A | 8.36 |
| Comparative Example 5 | 100/100 | A | poor | A | 11.90 |

The primer coating compositions used in Examples 4, 5 and 6 each was measured for the tensile strength and the elongation at breakage. The results are shown in Table 3 below.

TABLE 3

| | Tensile strength (kg/cm$^2$) | Elongation at breakage (%) |
| --- | --- | --- |
| Example 4 | 110 | 160 |
| Example 5 | 98 | 150 |
| Example 6 | 85 | 125 |

According to the present invention, the thermosetting polyurethane resin is used as the polyurethane film for use as the impact absorber on the surface of the plastic lens substrate. Hence, when the lens having the polyurethane film is immersed in a solution of the hard coat agent comprising a silicone resin in the subsequent plastic lens manufacturing stage, the polyurethane resin is not dissolved out so that a homogeneous plastic lens can be obtained. Further, the hard coat agent solution comprising a silicone resin is not stained by the polyurethane resin. Furthermore, the primer coating material mainly composed of a blocked polyisocyanate and a polyol is used so that workability can be improved.

While the present invention has been described in detail and with reference to specific embodiments thereof, it is to one skilled in the art that various changes and modifications can be made therein without departing from the spirit and scope of the present invention.

What is claimed is:

1. A process for producing a plastic lens which comprises the steps of:

providing a primer layer which has a thickness of from 0.05 to 5 µm and which improves the impact resistance of the plastic lens, which primer layer comprises a thermosetting polyurethane on the surface of a plastic lens substrate;

subsequently providing a hard coat layer comprising a silicone resin on the surface of said primer layer; and then providing a single-layer or multi-layer anti-reflection coating on the surface of said hard coat layer by depositing an inorganic material, wherein said primer layer which comprises a thermosetting polyurethane is provided by the steps of coating said plastic lens substrate with a primer coating composition comprising a blocked polyisocyanate and a polyester polyol, and then curing the coated composition by heating.

\* \* \* \* \*